INVENTORS
HOWARD L. SCHULTZ
DALE R. CORSON
BY William D. Hall
ATTORNEY

Patented May 20, 1952

2,597,297

UNITED STATES PATENT OFFICE 2,597,297

TEST SET FOR PULSE-ECHO RADIO LOCATORS

Dale R. Corson, Arlington, Va., and Howard L. Schultz, Wellesley, Mass., assignors, by mesne assignments, to the United States of America as represented by the Secretary of War Application April 18, 1945, Serial No. 588,990

8 Claims. (Cl. 343—5)

This invention relates in general to apparatus associated with radio communication devices and more particularly to apparatus for testing the operation of radio object locating systems.

One object of the invention is to provide testing means for observing the operation of a radio object locating system and hence to ascertain any departure from normal operating conditions.

Another object of the present invention is to afford means of measuring relative field intensities of radio object locating systems.

Still another object is to transmit pulses of radio energy at a standard, predeterminable power level.

Yet another object is to provide equipment for the performance of the above-mentioned functions in a compact, transportable form.

Further objects of this invention will be apparent upon reference to the following specification and the appended drawings in which.

This test set may be used in any one of several fashions, some of which are as follows: Means are provided for intercepting radiant energy from a transmitting system, the power level and wavelength of the aforesaid radiant energy being measured respectively by a bolometer and a wavemeter included as component parts of the test set. An externally generated trigger pulse actuates a signal generator which transmits a pulse of energy a predetermined time after receipt of the triggering signal, supplying a simulated echo to a radio object locating system for the purpose of giving an indication of the receiver characteristics. Means are also provided for viewing on a cathode ray oscilloscope screen wave and pulse shapes present in the test set and the system under observation.

The type of radio object locating system with which this test set is intended to find its chief use consists of a radio frequency transmitter modulated so that electromagnetic energy is radiated in short pulses, a receiver to amplify and demodulate that portion of the emitted energy reflected from distant objects, and indicating means usually oscillographic, to present intelligence so gained in visual form.

Figure 1:
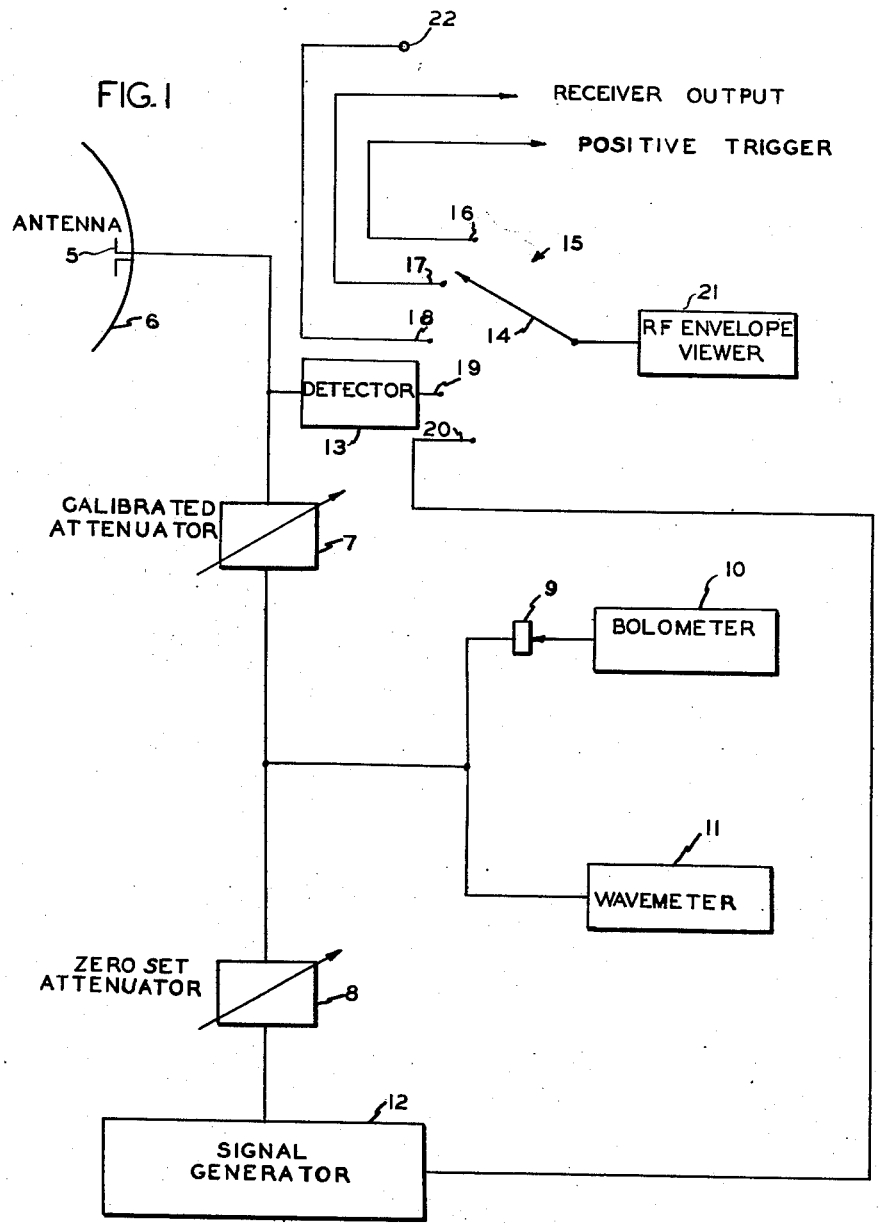
Fig. 1 is a simplified block diagram of one embodiment of the invention.

Referring now to Fig. 1, a dipole 5 is mounted in a parabolic reflector 6, attenuator 7 and zero-set attenuator 8 being connected in series in the radio frequency conductor of which dipole 5 is the termination. A T-junction between the two attenuators allows connection of a crystal detector 9 and a bolometer 10 in parallel with a wavemeter 11, the bolometer 10 being used to determine the power level of received energy or energy transmitted from the signal generator of the set and the wavemeter 11 being employed to measure the wavelength of energy fed to or from dipole 5. Zero-set attenuator 8 is connected to signal generator 12 which generates oscillatory radio energy upon receipt of a triggering signal. Arm 14 of multicontact switch 15 is connected to the R. F. envelope viewer 21 to allow observation and comparison of voltage waveforms existing at various points in the system. Contact 16 carries a positive trigger supplied from an associated radio object locating system, whereas contact 17 carries the output of a radio receiver which is part of that system. Contact 18 is connected to a jack 22 to which may be applied any signal which it may be desirable to observe on the viewer 21. Contact 19 is connected through detector 13 to dipole 5 in order that the envelope of incoming or outgoing R. F. signals may be checked. Contact 20 carries a pulse developed in signal generator 12 for the purpose of modulating radio energy generated and transmitted by the test set.

Figure 2:
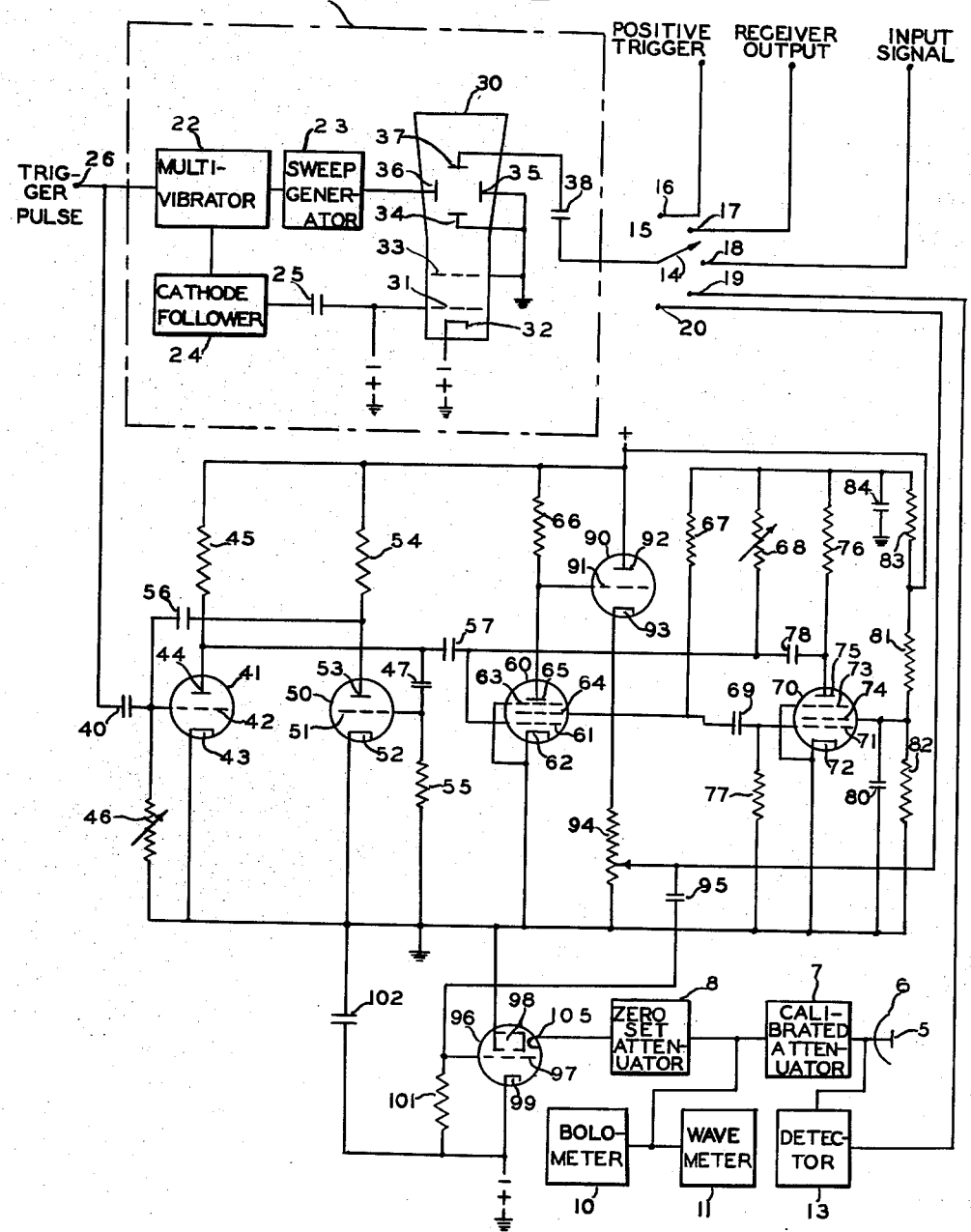
Fig. 2 is a more detailed partial schematic diagram of the system.

Further details of the circuit are shown in Fig. 2 to which reference is now made. The numeral 21 generally indicates the R. F. viewer which has been mentioned hereinbefore. A triggered delay multivibrator 22 generates a rectangular pulse output which is applied to sweep generator 23 and cathode follower 24. The output of cathode follower 24 is applied through suitable coupling means 25 to control grid 31 of cathode ray tube 30. Cathode 32 is held at a negative potential with respect to ground by suitable biasing means. Control grid 31 is maintained at a slightly more negative potential with respect to ground than is cathode 32. Accelerating electrode 33 being at ground potential is therefore positive with respect to control grid 31 and cathode 32. Vertical deflecting plate 34 and horizontal deflecting plate 35 are also held at ground potential. Horizontal deflecting plate 36 carries a suitable sweep voltage as supplied by sweep generator 23. Vertical deflecting plate 37 is tied through coupling capacitor 38 to arm 14 of multicontact switch 15. Contacts 16, 17, 18, 19, and 20 carry signals which have been recited hereinabove, and indicated on the drawing.

To terminal 26 is supplied an externally generated trigger pulse, connection being made from terminal 26 to multivibrator 22 and also through coupling capacitor 40 to grid 42 of vacuum tube 41. Cathode 43 of vacuum tube 41 is connected directly to ground, anode 44 being connected through load resistor 45 to a suitable source of positive potential. Variable resistor 46 is employed as a grid return resistor. Voltages appearing at anode 44 are transferred through coupling capacitor 47 to grid 51 of vacuum tube 50. Cathode 52 of vacuum tube 50 is grounded and anode 53 is connected to load resistor 54 which in turn is tied to the same source of positive potential which supplies vacuum tube 41. Grid return resistor 55 is connected between control grid 51 and ground. Feedback from anode 53 to grid 42 of vacuum tube 41 is provided by capacitor 56.

Capacitor 57 couples anode 44 of vacuum tube 41 to control grid 61 of vacuum tube 60. Cathode 62 is grounded, as is suppressor grid 63. Screen grid 64 is maintained positive with respect to cathode 62 by connection through resistor 67 to a source of positive potential. Anode 65 is connected through load resistor 66 to a suitable positive voltage supply. Positive grid return is provided for control grid 61 by connecting variable resistor 68 between it and a point of constant positive potential.

Screen grid 64 is unbypassed and hence variations in the current which it draws will appear as voltage variations across resistor 67. These variations are coupled to control grid 71 of vacuum tube 70 through capacitor 69. Cathode 72 and suppressor grid 73 are grounded, whereas screen grid 74 is bypassed by capacitor 80 and maintained at a positive bias by a voltage divider consisting of resistors 81 and 82. Anode 75 is connected to load resistor 76 and thence to a positive voltage source. Feedback capacitor 78 is connected between anode 75 of vacuum tube 70 and control grid 61 of vacuum tube 60. Control grid 71 is returned to ground through resistor 77. A voltage dropping network consisting of resistor 83 and capacitor 84 is employed to lower the positive supply voltage to a level suitable for biasing anode 75 of tube 70, and control grid 61 and screen grid 64 of tube 60. Alternating current components are bypassed around resistor 83 and the power supply by capacitor 84, thus permitting only a D. C. drop in resistor 83. Hence a constant voltage level is maintained.

Vacuum tube 90 is part of a cathode follower circuit, in which voltage variations appearing at anode 65 of vacuum tube 60 are impressed between control grid 91 and ground. Anode 92 is tied directly to a positive voltage supply whereas cathode 93 is connected to ground through potentiometer 94. The arm of this potentiometer is connected to contact 20 of the multicontact switch, enabling voltage variations existing across potentiometer 94 to be observed on the R. F. viewer.

These variations are also impressed through coupling capacitor 95 onto grid 97 of oscillator 96. This oscillator is of the velocity modulated type well known in the art by the name "klystron," which designation will be used hereinafter for purposes of simplicity. The resonant cavity 98 is held at ground potential. Cathode 99 is maintained highly negative with respect to ground by a suitable biasing source. Resistor 101 connects grid 97 and cathode 99, and capacitor 102 bypasses alternating currents around the negative biasing source. Coupling loop 105 extracts oscillatory energy from klystron 96, which energy is then passed through attenuators 7 and 8 and radiated by dipole 5. Bolometer 10 and detector 13 are as described in connection with Fig. 1.

Performance of the various functions for which this system was designed requires utilization of all or part of the above-mentioned components according to the particular use to which the set is being put.

If, for example, this set is being used to check the characteristics of energy radiated from a radio object locating system, dipole 5 and reflector 6 are set up in a predetermined relation to the radiating means of the radio locating system under test. This location is usually so chosen with regard to distance and orientation that the attenuation undergone by transmitted energy between the points of transmission and interception is known. In subsequent tests the same position is used so that the attenuation factor will remain constant over a series of measurements, and accurate comparison can be made between any of the series.

With the antenna properly positioned, zero-set attenuator 8 is set to a point of maximum attenuation. Doing this so debilitates energy extracted from klystron 96 by coupling loop 105 that its effect on readings taken on bolometer 10 is negligible. Calibrated attenuator 7 is then adjusted until bolometer 10 reads a predetermined value. Departures from optimum power radiation from the radio locator transmitter are detected by the setting of attenuator 7. If the amount of attenuation introduced must be reduced from a previous setting, the power received by the test set antenna is less than formerly. If, as has been pointed out hereinbefore, the relative locations of transmitting and receiving antennas are always the same, it may be inferred that the reduction of power is due to a fault in the transmitter.

Determination of the transmitter frequency is done by measuring the wavelength of energy received by the test set by means of a wavemeter 11 which may be of any suitable type as governed by the frequency ranges to be covered.

Diagnosis of transmitter faults is also aided by viewing the envelope of R. F. energy received by the test set. Detector 13 demodulates received signals and applies the voltage waveforms thus obtained to contact 19 of the multicontact switch 15. When arm 14 makes contact with terminal 19, signals appearing thereon are impressed through blocking capacitor 38 onto vertical deflection plate 37 of cathode ray tube 30. Each time a pulse of energy is radiated from the transmitter, a trigger signal trips delay multivibrator 22, which applies a square pulse to sweep generator 23, the latter generating a substantially linear horizontal sweep voltage. Therefore the horizontal sweep is automatically synchronized with the vertical deflection voltage and a stationary image appears on the cathode ray tube screen. Delay multivibrator 22 also applies a rectangular pulse of positive polarity to cathode follower 24 simultaneously with the pulse applied to sweep generator 23. The output of cathode follower 24, also a positive pulse, is impressed through coupling capacitor 25 on control grid 31 of cathode ray tube 30, decreasing the negative bias thereon. Since grid 31 is normally biased beyond cutoff, application of such an unblanking pulse is necessary to allow a trace to appear on the screen of cathode ray tube 30. If the bias on grid 31 were always above cutoff, an extremely bright spot would be present at one side of the screen, since the horizontal sweep cycle consists of a sawtooth deflection followed by a relatively long resting period.

Testing of another main component of a radio object locating system, the receiver, can also be done with the aid of this test set. Mistuning, ageing or failure of parts, and similar faults will often be indicated by a loss of receiver sensitivity, the onset of which may occur so gradually that it remains unnoticed in ordinary operation of the receiver. Ready means for performance of day-to-day comparative checks of receiver sensitivity are provided by the present invention, thereby facilitating detection of gradual receiver failure.

To do this, a signal of standardized power level is transmitted to the receiver being tested, and the output of the receiver, containing the R. F. envelope of the transmitted signal is observed on an oscilloscope and compared with previous checks made under identical conditions.

Referring again to Fig. 2, a trigger pulse applied to terminal 26 is passed through coupling capacitor 40 to grid 42 of vacuum tube 41. This tube, vacuum tube 50, and the associated circuit elements connected thereto form a multivibrator of the delay type. This is an unbalanced multivibrator in which dissymmetry is quite pronounced. If such a multivibrator is allowed to run free, the total period is long, but it is customarily triggered by a periodic pulse of somewhat higher frequency with which it will synchronize. The general principles of multivibrator operation are well known in the art, and will not be discussed here.

In the present circuit, the unbalance is such as to cause tube 41 to conduct for a longer period of time than does tube 50. A negative trigger pulse applied to grid 42 while vacuum tube 41 is conducting reverses the status of the tubes. Cessation of current flow through plate load resistor 45 removes the IR drop which existed across it prior to application of the trigger. Therefore anode 44 rises abruptly to the full potential of the positive plate supply source. After a period of time governed chiefly by the time constant of the series resistor-capacitor combination comprising capacitor 56 and resistors 46 and 54, grid 42 rises to a potential where conduction again occurs in tube 41. At this point tubes 41 and 50 revert to their original condition, grid 51 being forced down below cutoff potential when an IR drop again takes place in resistor 45. Hence a rectangular, positive voltage pulse, comparatively short in duration, has been generated at anode 44. The duration of this pulse is controllable by variation of grid resistor 46 which is part of the discharge path of capacitor 56. However, even the maximum duration of this pulse is but a small fraction of the total operating cycle of the multi-vibrator, being in one embodiment of the order of 0.2% of the free-running period.

This pulse is used to control the operation of another delay multivibrator composed of circuit elements 60 through 82. This circuit differs from the previous multivibrator in that pentodes are used, and the necessary feedback voltage is obtained from the screen grid of one of these tubes.

At the time of arrival of a pulse from the previous circuit, vacuum tube 60 is conducting and vacuum tube 70 is non-conducting. Control grid 61 of tube 60 being biased positively through resistor 68, draws sufficient current so that the IR drop in resistor 68 very closely approximates the voltage of the positive bias source. Thus a finite resistance exists between grid 61 and cathode 62.

Capacitor 57 and the parallel combination of resistor 68 and the grid-cathode resistance of tube 60 form a differentiating circuit. A pulse generated at anode 44 of tube 41 being applied across this circuit, two extremely narrow voltage peaks, one positive, corresponding to a rise in the applied voltage, and one negative, corresponding to a drop in applied voltage, would normally appear across the resistance element. In this case, however, the positive peak is unimportant, since an increase in grid voltage will only cause the grid to draw more current on the other hand, the negative peak which corresponds to the trailing edge of an applied pulse, will decrease the flow of grid and plate current, initiating multivibrator action.

Since a drop in grid-cathode voltage reduces the total space current in tube 60, this current including that drawn by screen grid 64 and anode 65, both screen grid and anode will rise in potential by reason of lessened IR drop in their respective load resistors 67 and 66. Positive increments of voltage on screen grid 64 are impressed through capacitor 69 on control grid 71 of vacuum tube 70, increasing current flow in this tube and thus lowering the potential of anode 75. This negative voltage increment is transferred to control grid 61 of tube 60 through coupling capacitor 78, supplementing the negative trigger which initiated the action. It can be seen that this is normal multivibrator operation. Therefore after a period of time governed chiefly by the capacitance of capacitor 78 and the resistance of resistor 68, grid 61 will rise to a potential at which tube 60 again becomes conductive. When this occurs, anode 65 drops in potential to its original value.

The rectangular voltage pulse so generated is applied to grid 91 of cathode follower 90. No blocking capacitor is necessary between anode 65 and grid 91 because the drop in cathode potentiometer 94 approximates the drop across vacuum tube 60. Cathode 93 follows variations in potential applied to grid 91 and hence the pulse output of vacuum tube 60 appears across potentiometer 94. The arm of this potentiometer is connected directly to contact 20 of the multicontact switch, whereby the pulse as it appears in the output of tube 90 can be checked for duration, amplitude and irregularity.

This pulse voltage is also coupled to accelerating grid 97 of klystron 96 by means of capacitor 95. This grid is normally at the potential of cathode 99, thus inhibiting the occurrence of oscillation in klystron 96. During the time of application of a pulse, however, grid 97 is raised to a potential at which oscillation may take place. Under such conditions energy is taken from the klystron by coupling means 105, passed through attenuators 7 and 8, and radiated from dipole 5.

In practice, attenuator 8 is usually set to a value which gives a predetermined power reading on bolometer 10, arm 14 of switch 15 is rotated to make contact with terminal 17, which carries the output of a receiver under test, and calibrated attenuator 7 is varied until the signal radiated from dipole 5 reaches a standard size as viewed on oscilloscope 30. If certain variables, including setting of attenuator 8, positioning of dipole 5 with respect to the radio locating system receiving antenna, and the receiver gain setting are maintained at predetermined values, the setting of attenuator 7 necessary to produce a given deflection on oscilloscope 30 is a measure of relative receiver sensitivity. Thus it is possible to detect receiver failures the symptoms of which may be so slight as to go unnoticed otherwise.

It will be noted that if each trigger signal applied to terminal 26 is coincident with transmission of a pulse of R. F. energy on the radio object locating system being tested, as is customarily the case in practice, signals radiated by the test set will appear on the indicating means associated with the aforesaid radio locating system as an artificial echo delayed behind the transmitted signal. This delay is introduced by the first multivibrator in signal generator 12 and its duration is determined by the setting of variable resistor 46.

Furthermore, it can be seen that the signal generator incorporated in this set may also be used in any instance where it is desired to have a reference source of radiant energy.

The components of this invention, i. e. delay multivibrators, sweep generator, oscillator, attenuators, etc, are individually known in the art, and may be replaced with units having substantially similar operating characteristics. However, we claim all these and such further modifications which may fall fairly within the spirit and scope of the hereinafter appended claims.

What we claim is:

1. An apparatus for testing the operation of a radio object locating system having means for periodically transmitting pulses of electromagnetic energy into space to irradiate an object therein and a receiver responsive to a portion of said energy after reflection from said object, said apparatus comprising a cathode ray tube indicating means as a component part thereof coupled to the output of said receiver, a signal generator for producing radio frequency pulses at substantially the same frequency as the transmitted pulses, means coupled between said radio object location system and said signal generator for synchronizing the production of said radio frequency pulses with the transmitted pulses, delay means in circuit with said signal generator for delaying each of said radio frequency pulses for a predetermined time interval relative to its corresponding transmitted pulse whereby a reflected signal is simulated, an antenna coupled to the output of said signal generator for directionally emitting the pulses from said signal generator whereby they are received by said receiver, and calibrated means for varying the power level of the pulses from said signal generator to produce an indication of predetermined amplitude on said cathode ray tube indicating means whereby the reading of said calibrated means provides an indication of the sensitivity of said receiver.

2. A test set for checking the sensitivity of the receiver of a pulse-echo radio location unit comprising means coupled to said location unit for generating radio frequency pulse signals in synchronism with the pulse signals transmitted by said unit, delay means coupled to the output of said generating means for delaying said generated radio frequency pulse signals relative to said transmitted pulse signals by an adjustable time interval, pulse power measuring means, first adjustable attenuation means having its input connected to the output of said delay means and its output to said power measuring means for attenuating said delayed pulse signals to a predetermined power level as indicated on said power measuring means, second adjustable attenuation means connected to the output of said first attenuation means, antenna means connected to the output of said second attenuation means for radiating said delayed-attenuated radio frequency pulse signals to said location unit, said pulse signals being received by said receiver as simulated echo signals, and cathode ray tube indicating means forming a component part of said test set connected to the output of said receiver for indicating said simulated echo signals, the amplitude of said simulated echo signals and the adjustment setting of said second attenuation means being indications of the sensitivity of said receiver.

3. A test set as set forth in claim 2, further including means for determining the wave shape of said attenuated, delayed radio frequency pulse signals comprising a detector connected to the output of said second attenuation means for detecting said pulse signals, and means for impressing said detected pulses on said cathode ray tube indicating means.

4. A test set as set forth in claim 3 further including means for determining the wave shape and power of the pulse signals transmitted from said location unit comprising said antenna means for receiving said transmitted pulse signals, means connecting said antenna to said detector for detecting said transmitted pulse signals, means for impressing said detected pulse signals on said cathode ray tube indicating means for indicating the wave shape of said pulse signals, means connecting said antenna to the input of said second attenuation means, means connecting the output of said second attenuation means to said power measuring means, said first attenuation means being adjusted to provide maximum attenuation, whereby the adjustment of said second attenuation means and the power level reading of said power measuring means are indications of the power of said transmitted pulses.

5. A test set for a pulse-echo radio locator comprising a first variable delay multivibrator having its input connected to the radio locator so as to be triggered in synchronism with the pulse transmitted by said locator, means coupled to the output of said first multivibrator for differentiating the pulses from said multivibrator to produce triggering pulses coincident with the lagging edges of said pulses from said multivibrator, a second variable delay multivibrator having its input connected to the output of said differentiating means so as to be triggered by said triggering pulses, a translation device having its input connected to the pulse output of said second multivibrator, and a normally inoperative transmitting means for transmitting a radio wave at the radio locator carrier frequency, the output of the translation device being connected to the transmitting means so as to excite said means to transmit a simulated echo pulse at the radio locator carrier frequency.

6. A test set for a pulse-echo radio locator comprising a first adjustable delay multivibrator having its input connected to the radio locator so as to be triggered in synchronism with the pulses transmitted by said locator, said first multivibrator being adapted when triggered to produce a first pulse of adjustable length, a second adjustable delay multivibrator adapted when triggered to produce a second pulse of variable length, means responsive to the trailing edge of the first pulse to trigger the second multivibrator, an oscillator for producing radio waves at the radio locator carrier frequency, and means coupling the output of said second multivibrator to the input of said oscillator so as to excite said oscillator for the duration of the pulse output of said second multivibrator, whereby a simulated echo pulse of radio waves is produced for an interval determined by the setting of said second multivibrator after a delay interval determined by the setting of said first multivibrator.

7. A test set for a pulse-echo radio locator comprising a first variable delay multivibrator having its input connected to the radio locator so as to be triggered in synchronism with the pulses transmitted by said locator, differentiating means having its input connected to the pulse output of said first delay multivibrator for deriving therefrom first and second pulses corresponding to the leading and trailing edges respectively of said output pulses, a second variable delay multivibrator having its input connected to the output of said differentiating means so as to be triggered by said second pulses, a cathode follower having its input connected to the pulse output of said second multivibrator, a klystron oscillator having its input connected to the pulse output of said cathode follower, said oscillator being excited into radio frequency oscillations for the duration of each of said cathode follower output pulses, adjustable attenuation means having its input connected to the output of said oscillator for attenuating said radio frequency oscillations, and antenna means connected to the output of said attenuation means.

8. Apparatus for determining the reception sensitivity of a radio locator unit of the character used for transmission of radio signals and for reception of echoes produced by obstacles reflecting such signals, comprising triggering means for producing triggering signals in said unit, means coupled to said triggering means for producing pulse signals which are retarded by a predetermined amount with respect to said triggering signals, means for generating an energy wave at the frequency of the carrier component of said radio signals, means for modulating the energy wave by the retarded pulse signals, and calibrated means for adjusting the power level of the modulated energy wave to produce a predetermined echo effect for reception of the locator unit, whereby the amount of adjustment of the power level of the modulated energy wave provides an indication of the reception sensitivity of said locator unit.

DALE R. CORSON.
HOWARD L. SCHULTZ.

REFERENCES CITED

The following references are of record in the file of this patent:

UNITED STATES PATENTS

| Number | Name | Date |
|---|---|---|
| 1,944,564 | Lewis | Jan. 23, 1934 |
| 2,134,716 | Gunn | Nov. 1, 1938 |
| 2,285,211 | Korman | June 2, 1942 |
| 2,420,211 | Tourshou | May 6, 1947 |
| 2,421,016 | Deloraine | May 27, 1947 |
| 2,425,600 | Coykendall | Aug. 12, 1947 |
| 2,477,485 | Jacob | July 26, 1949 |

OTHER REFERENCES

"Operating Instructions and Service Notes for RCA Electronic Sweep Oscillator," Stock Nos. 150 and 150A, and "Cathode-Ray Oscillograph," Stock Nos. 151 and 151A, 1937, published by RCA Mfg. Co., Camden, N. J., pages 4 to 7.